Patented Dec. 17, 1940

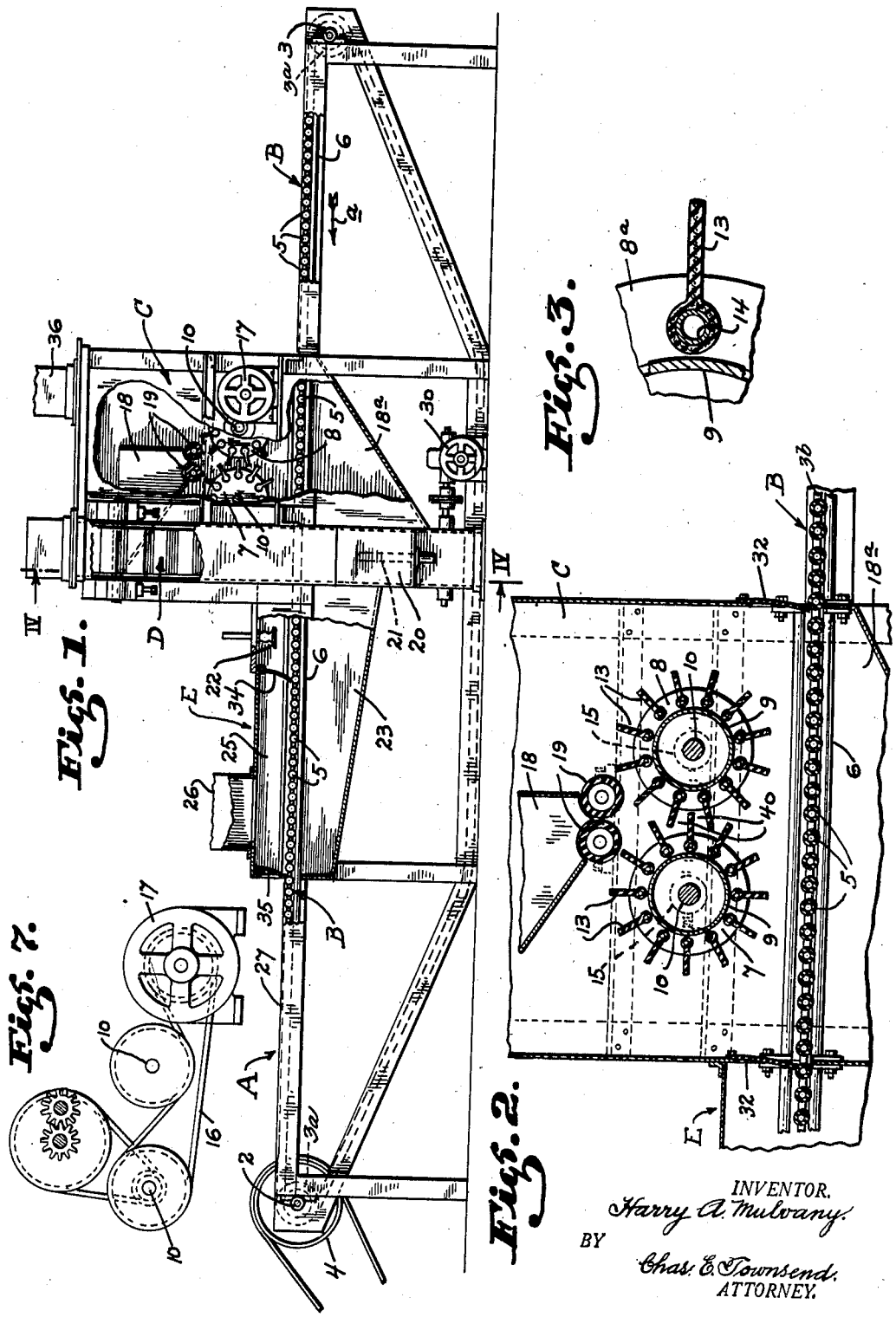

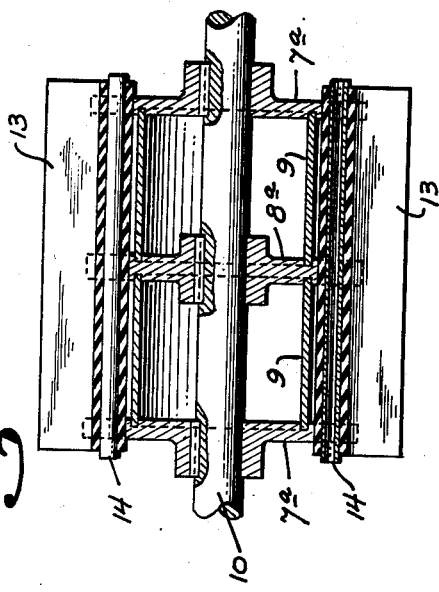
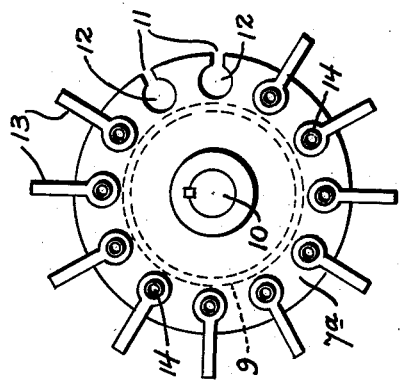
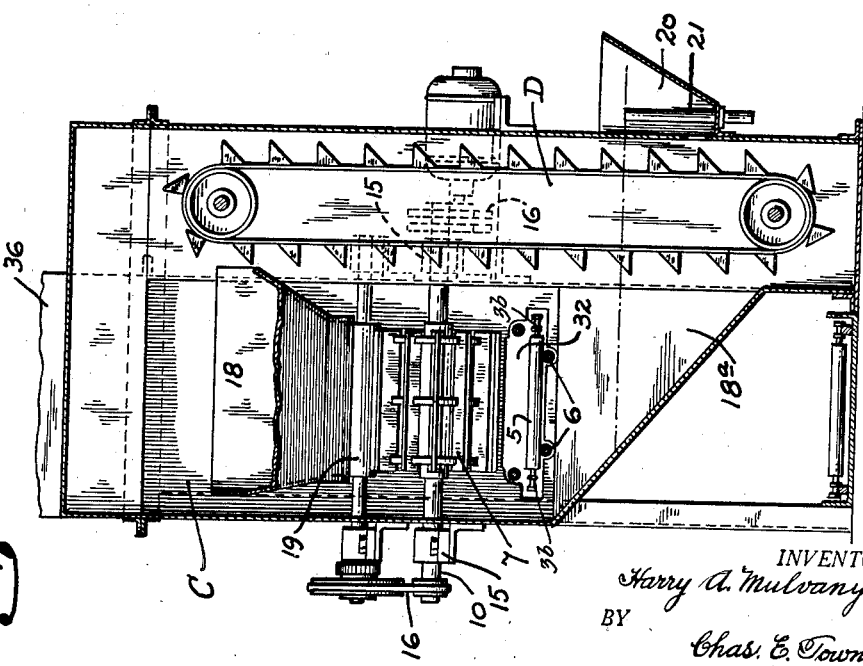

2,225,482

UNITED STATES PATENT OFFICE 2,225,482

CLEANING MACHINE

Harry A. Mulvany, Berkeley, Calif.

Application March 24, 1937, Serial No. 132,796

4 Claims. (Cl. 51—9)

This invention relates to a method and apparatus for cleaning food products such as eggs, apples, pears, etc.

In the poultry industry, particularly where large quantities of eggs are handled, it has become common practice to dry-clean eggs prior to storing or placing them on the market by subjecting the eggs to the abrasive action of sand projected against the eggs either by an air blast or by centrifugal action. The larger percentage of eggs are readily cleaned by this method, but so-called "heavy dirty" eggs are encountered, and these are usually sorted out and wet washed one by one by hand.

In the fruit industry, particularly where apples and pears are being handled by the packing houses, the problem of removing arsenic from the surface of the fruit is encountered as arsenic has accumulated on the fruit in varying quantities depending upon the number of times the fruit has been sprayed with an arsenious solution during the growing season. Government regulations require the removal of the arsenic before packing or shipping to the market, and while both dry and wet cleaning processes are employed, they are far from satisfactory.

The object of the present invention is to provide a method and apparatus whereby products of the character described may be readily and economically cleaned without injury to the product; to provide a cleaning method which comprises the combined action of water and an abrasive; to provide an apparatus in which rotors are employed to project a mixture of water and a suitable abrasive against the product to be cleaned with sufficient velocity to cause both a wiping or cleaning action and an abrasive action; to provide means for feeding the water and abrasive at a uniform and controlled rate to the rotors; to provide means for rinsing and drying the product after cleaning; to provide means for continuously cleaning the abrasive and for disposing of the removed dirt or other matter; and further, to provide rotors with removable renewable blades therefor of novel assembly and construction.

The invention is shown by way of illustration in the accompanying drawings in which—

Fig. 1 is a side elevation of the apparatus, said side elevation being partially broken away, and parts being shown in section;

Fig. 2 is an enlarged cross-section of the rotors and the feed rollers whereby water and an abrasive is delivered to the rotors, said view also showing the conveyor upon which the product to be cleaned is supported;

Fig. 3 is an enlarged sectional detail view of one of the removable blades of the rotor and a portion of the rotor;

Fig. 4 is a cross-section taken on line IV—IV of Fig. 1;

Fig. 5 is an enlarged longitudinal section of one of the rotors;

Fig. 6 is an enlarged end view of one of the rotors showing two of the blades removed; and Fig. 7 is a diagrammatic view showing the method of driving the rotors and the feed rollers.

Referring to the drawings in detail, and particularly Figs. 1 and 4, A indicates an elongated frame at opposite ends of which are journaled cross-shafts 2 and 3, either of which may be driven through a pulley 4 or similar means. Secured on opposite ends of the respective shafts within the frame A are sprocket gears 3a, and carried thereby are a pair of endless chains 3b between which are mounted a series of rubber covered rollers 5, said chains and rollers forming an endless conveyor generally indicated at B upon which eggs or other products to be cleaned are placed.

The upper reach or run of the conveyor is horizontally disposed and is supported substantially throughout its length by a pair of longitudinally extending rubber-covered rods 6 which also impart rotational movement to the roller 5 about their axes when the conveyor is in motion.

Disposed at a point approximately centrally of the elongated frame A is a housing C through which the conveyor passes. During this passage through the housing, the eggs or other products to be cleaned are subjected to the cleansing action of water and an abrasive material. The water and the abrasive employed in the form of a mixture is projected against the conveyor or the eggs placed thereon by a pair of rotors 7 and 8. These rotors are best shown in Figs. 2, 5 and 6. Each rotor is identical and consists of two end disks 7a—7a, and an intermediate plate 8a. These plates are spaced apart by cylindrical drums 9—9, and the drums are in turn held concentric with relation to a shaft 10 by means of concentric grooves formed in the faces of the disks. The outer peripheral edge of each disk is slotted as shown at 11, and each slot terminates in a circular opening 12. There may be any number of slots and openings desired, as they merely serve the function of supporting a series of paddles generally indicated at 13, these paddles being made of vulcanized rubber which may be reinforced with fabric as shown. The inner end of each paddle is cylindrical and hollow to permit a metal tube 14 to be passed therethrough. The faces of the paddles are subjected to comparatively little wear, but the ends of the paddles wear to a considerable extent, and as such must be removed and renewed from time to time. This is readily accomplished, as when one or more paddles are to be removed, it is only necessary to exert an endwise pull on the paddles. By doing so, they are removed from the disk. New paddles having the metal tube 14 inserted therein are conversely shoved in through the openings 12. Thus the operation of removing and re-inserting new paddles is quickly accomplished. The function of the tube 14 is that of securing the paddles against radial movement when inserted, as they are subjected to considerable centrifugal pull when the rotors are in operation.

The rotors are mounted on individual shafts such as shown at 10, and these in turn are supported in suitable bearings as indicated at 15. They are driven by a chain drive or the like, as shown at 16, from the motor 17, and, due to the arrangement of the chain drive as shown in Fig. 7, a positive interlocked drive is formed, permitting the paddles to pass and clear each other during rotation of the rotors, as clearly shown in Fig. 2.

The type of abrasive to be employed depends upon whether eggs or fruits are to be cleaned. If eggs are being treated, sand or a similar abrasive may be employed, while if apples are being treated, shredded rubber or a similar material may be employed. Be that as it may, regardless of whether a hard sharp abrasive or a soft light-weight abrasive is being used, water will in each instance be mixed with the abrasive. This mixed material is deposited in a hopper 18. Below this hopper is disposed a pair of rubber covered feed rollers 19 which are rotated at a suitable speed, and as they revolve, the material is delivered centrally between the rotors. As the rotors are rotated at a high speed, for instance 1,750 R. P. M. or more, the paddles will strike the material and will project it downwardly against the eggs on the conveyor with sufficient velocity to produce both an abrasive and a cleansing action. If eggs are being cleaned, they will be placed in row formation between the rollers 5, and as the conveyor is traveling in the direction of arrow a, each roller 5 will rotate and so will the eggs supported thereby. The eggs are thus constantly presenting new surfaces to the abrasive material projected against them, and they are thus thoroughly cleaned, rotation of the rollers 5 being insured by frictional contact between them and the rods 6 whereby they are supported.

By referring to Fig. 2, it will be noted that there is a sufficient space between the rollers 5 to permit the abrasive and water to pass between the rollers and down into a hopper 18a disposed below the conveyor. An endless elevator generally indicated at D (see Fig. 4) gathers this material and elevates or returns it to the hopper 18. The process thus may be continuously operated. One side of the hopper 18a is extended as shown at 20, and placed therein is an overflow pipe 21. Excess water and dirt, etc., will continuously discharge through this pipe.

The eggs or other material, after passing through the housing C, will next enter a second housing E and pass under a spray nozzle 22 (see Fig. 1) where any abrasive material left on the product will be removed and the product thoroughly rinsed and cleaned. The water, after rinsing and finally cleaning the product, will collect in the pan 23, which in turn directs it to the main receiving hopper 18a. The water entering this hopper washes the abrasive employed, and, furthermore, floats off the dirt and other material removed. As this is continuously discharging from the overflow pipe 21, the abrasive will be continuously clean. When a fruit coated with arsenic is being cleaned, the percentage of arsenic in the water may be maintained at a minimum by regulating the quantity of spray or rinsing water applied. After the eggs or other products have been thoroughly rinsed or cleaned, they pass into a chamber 25. A conduit 26 connects therewith and this delivers warm dry air at a sufficient velocity and temperature to dry the product. The product thereafter passes out of the housing E and is removed from the conveyor at the point indicated at 27, the product to be cleaned being delivered at the opposite end of the conveyor in any suitable manner. The conveyor B is maintained in continuous motion by the driving pulley 4, the rotors are driven from the motor 17, and the feed rollers 19 may be driven in unison therewith, as shown in Fig. 7. The elevator D may be driven by a motor 30 or other suitable means. Flexible flaps 32 are disposed at opposite ends of the housing C to prevent the abrasive from spattering or escaping from the housing. A similar flap 34 confines the spray or rinsing water, and a flap 35 at the end of the housing E prevents excessive escape of the warm air delivered for drying purposes. This air obviously passes downwardly through the conveyor into the pan 23 and then enters the housing C together with the rinse water, and finally escapes through the upper portion of the housing through a stack 36.

An important feature of the invention is the construction and operation of the rotors. By referring to Fig. 2, it will be noted that the paddles 13 overlap as they pass each other, that is, in the space formed between the rotors. This is made possible by the rotors being interlocked by the chain drive provided. A considerable amount of air is trapped between the blades during operation of the rotors and is slightly compressed in the pockets 40 formed between the overlapping blades, this slight compression being made possible by employing the drums 9. The air thus trapped and compressed between the blades seems to function as a cushion for the abrasive material, as actual practice shows that the faces of the paddles wear little, if any, the only wear encountered being at the ends of the blades, and this has also been materially reduced since the drums 9 have been employed.

While this and other features of the present invention have been more or less specifically described and illustrated, I wish it understood that various changes may be resorted to within the scope of the appended claims, and similarly, that the material and finish of the several parts employed may be such as the manufacturer may decide, or varying conditions or uses may demand.

Having thus described my invention, what I claim and desire by Letters Patent is—

1. In an apparatus of the character described a rotor comprising a shaft, a pair of spaced disks having a plurality of radially disposed slots formed in the peripheral edge and the inner end of each slot terminating in an enlarged opening, and a plurality of paddles having a cross-sectional shape identical to the slots and openings and insertable endwise through the slots and openings in the disks, the inner end of each paddle being hollow, and a rod insertable through the hollow inner end of each paddle to secure it against removal in a radial direction.

2. In an apparatus of the character described a pair of spaced parallel rotors, a plurality of radially extending paddle blades on each rotor, a drum on each rotor interior of the blades, means for interlocking and driving the rotors in unison and toward each other so that the paddle blades will pass between each other in overlapping relation when passing the axes of the rotors, said drums forming air cushioning pockets between the overlapping paddles, and means disposed above the rotors for delivering a mixture of liquid and an abrasive between the rotors and said mixture being carried by the air in the pockets and being discharged from the lower side of the rotors with sufficient velocity to cause abrasion and cleansing of products placed in the path of projection of the mixture.

3. In an apparatus of the character described, a pair of spaced parallel rotors, a plurality of radially extending paddle blades on each rotor, means for interlocking and driving the rotors in unison and toward each other so that the paddle blades will pass between each other in overlapping relation when passing the axis of the rotors, said rotors forming air-cushioning pockets between the overlapping paddles, and means disposed above the rotors for delivering an abrasive between the rotors, said abrasive being carried by the air in the pockets and being discharged from the lower side of the rotors with sufficient velocity to cause abrasion of products placed in the path of projection of the abrasive.

4. In an apparatus of the character described an elongated frame, a housing disposed substantially midway of the frame, a conveyor passing through the housing and extending from end to end of the frame, said conveyor adapted to receive products to be cleaned and to convey them through the housing, a pair of rotors disposed within the housing above the conveyor, a plurality of radially extending paddles on the rotors, a hopper, together with means for feeding a mixture of water and an abrasive to a point between the rotors and in the path of travel of the paddles, whereby said mixture will be struck by the paddles and projected downwardly against the product on the conveyor with sufficient velocity to cause abrasion and cleansing of the product during passage through the housing, a second hopper disposed below the conveyor to receive the liquid and abrasive, a third hopper disposed adjacent the second hopper, a separating wall between the hoppers, said wall having an opening formed therein to permit flow between the hoppers, a conveyor for continuously returning liquid and abrasive materials from the second to the first named hopper, means for projecting a spray of water against the product after it has been subjected to the action of the abrasive, to rinse and clean the product, means for directing the rinsing water through the abrasive in the second hopper and into the third hopper to carry removed foreign matter from the second to the third hopper, and an overflow pipe in the third hopper to maintain a predetermined liquid level in the second and third hoppers and for permitting a continuous discharge of the rinse water and foreign matter carried thereby.

HARRY A. MULVANY.